(12) United States Patent
Bouron et al.

(10) Patent No.: US 8,950,945 B2
(45) Date of Patent: Feb. 10, 2015

(54) ROLLER BEARING FOR A TUNNELLER

(71) Applicants: Cyril Bouron, Avallon (FR);
Jean-Baptiste Magny, Migé (FR);
Pascal Ovize, Chitry le Fort (FR)

(72) Inventors: Cyril Bouron, Avallon (FR);
Jean-Baptiste Magny, Migé (FR);
Pascal Ovize, Chitry le Fort (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/933,574

(22) Filed: Jul. 2, 2013

(65) Prior Publication Data
US 2014/0010492 A1 Jan. 9, 2014

(30) Foreign Application Priority Data
Jul. 4, 2012 (FR) .................................... 12 56402

(51) Int. Cl.
| | | |
|---|---|---|
| F16C 19/54 | (2006.01) | |
| F16C 19/40 | (2006.01) | |
| F16C 19/30 | (2006.01) | |
| F16C 33/58 | (2006.01) | |
| F16C 19/38 | (2006.01) | |
| E21D 9/06 | (2006.01) | |
| F16C 33/51 | (2006.01) | |
| F16C 33/60 | (2006.01) | |
| F16C 19/50 | (2006.01) | |

(52) U.S. Cl.
CPC . *F16C 19/38* (2013.01); *E21D 9/06* (2013.01); *F16C 33/51* (2013.01); *F16C 33/60* (2013.01); *F16C 19/505* (2013.01); *F16C 2300/14* (2013.01)

USPC ............ 384/455; 384/551; 384/619; 384/621

(58) Field of Classification Search
CPC .......... F16C 19/38; F16C 33/51; F16C 33/60; F16C 2300/14
USPC ................. 384/452, 455, 522, 551, 604, 608, 384/613–623
See application file for complete search history.

(56) References Cited

U.S. PATENT DOCUMENTS 1,971,782 A * 8/1934 Herrmann ...................... 384/455
2,417,559 A * 3/1947 Larson .......................... 384/573
(Continued)

FOREIGN PATENT DOCUMENTS

DE 3842464 A1 7/1989
DE 202010002282 U1 5/2010
(Continued)

*Primary Examiner* — Alan B Waits
(74) *Attorney, Agent, or Firm* — Bryan Peckjian; SKF USA Inc. Patent Dept.

(57) ABSTRACT

A roller bearing for a tunneller having an inner ring, an outer ring, two sets of rolling elements arranged between the tracks formed on the rings, the first set of rolling elements including at least one roller able to withstand axial stresses and the second set of rolling elements including an angular-contact roller that is able to withstand both radial and axial stresses, the inner and outer rings being concentric about an axis of rotation of the roller bearing. Each roller in the first set includes a first axis of revolution ($Y_1$-$Y_1$) inclined in relation to the axis of rotation (X-X) by a first angle ($\alpha_1$) of between 45° and 95° and each roller in the second set includes a second axis of revolution ($Y_2$-$Y_2$) inclined in relation to the axis of rotation (X-X) by a second angle ($\alpha_2$) of between 0° and 45°.

19 Claims, 4 Drawing Sheets

(56) References Cited

U.S. PATENT DOCUMENTS

| | | | |
|---|---|---|---|
| 2,454,028 A * | 11/1948 | Baker et al. | 384/623 |
| 2,643,920 A | 6/1953 | Olszewski | |
| 3,304,137 A * | 2/1967 | Strassberg | 384/455 |
| 3,501,212 A * | 3/1970 | Husten et al. | 384/614 |
| 3,738,718 A * | 6/1973 | Jacob et al. | 384/455 |
| 3,938,866 A * | 2/1976 | Martin | 384/623 |
| 2005/0018940 A1 * | 1/2005 | Obayashi | 384/623 |
| 2010/0316322 A1 * | 12/2010 | Derrer et al. | 384/571 |

FOREIGN PATENT DOCUMENTS

| | | | |
|---|---|---|---|
| FR | 2947598 A1 | 1/2011 | |
| GB | 2378988 A | 2/2003 | |
| JP | 63312512 A * | 12/1988 | F16C 19/54 |

* cited by examiner

ROLLER BEARING FOR A TUNNELLER

This application claims priority to French patent application no. 1256402 filed on Jul. 4, 2012, the contents of which are fully incorporated herein by reference.

TECHNICAL FIELD

The present invention relates to the field of roller bearings, in particular roller bearings comprising an outer ring, an inner ring and two rows of rolling elements, such as rollers, arranged between the rings. More specifically, the invention concerns the field of large-diameter roller bearings, in particular those used in tunnel boring machines, such as tunnellers.

BACKGROUND

Large-diameter roller bearings usually include two concentric inner and outer rings and at least one row of rollers arranged between the tracks made in the rings. Such roller bearings are usually under relatively large radial and axial loads.

Roller bearings comprising three rows of rollers, of which two rollers bear the axial stresses and one roller bears the radial stresses, are known. However, such roller bearings are difficult to design without any play. Furthermore, the second row of axial rollers is underused and increases manufacturing costs.

In this regard, reference may be made to document FR 2 947 598, which describes a slew ring having a roller bearing comprising an inner ring, an outer ring and two rows of angular-contact bearings arranged between the rings. The axis of revolution of each of the rollers is inclined in relation to the axis of rotation of the roller bearing at an angle of between 34.degree. and 40.degree.

However, such roller bearings do not absorb enough stress and do not enable axial size to be minimized.

The present invention is therefore intended to overcome these drawbacks.

SUMMARY

More specifically, the present invention is intended to provide a roller bearing device that is easy to manufacture and assemble, that is small and cheap, and that efficiently distributes the axial preload on the inner ring.

The invention relates to a roller bearing, in particular for a tunneller, comprising an inner ring, an outer ring, and two sets of roller elements arranged between the tracks formed in the rings. The first set of roller elements includes at least one roller able to withstand the axial stresses and the second set of roller elements includes an angular-contact roller able to withstand both the radial and axial stresses. The inner and outer rings are concentric about an axis of rotation of the roller bearing.

Each roller in the first set includes a first axis of revolution inclined in relation to the axis of rotation by a first angle of between 45.degree. and 95.degree. and each roller in the second set includes a second axis of revolution inclined in relation to the axis of rotation by a second angle of between 0.degree. and 45.degree.

Thus, the rollers in the first roller set can absorb the axial stresses and the rollers in the second roller set can absorb both the radial and axial stresses applied to the roller bearing.

Advantageously, the first angle is between 85.degree. and 95.degree., for example 90.degree.

Advantageously, the second angle is 25.degree.

In one embodiment, the rollers in the first set are of a different size to the rollers in the second set, such as to absorb greater stress in one direction than in another.

Each roller may have a rolling surface in contact with the tracks and two opposing surfaces in contact with the guide surfaces formed on each of the rings, the tracks forming an angle of 90.degree. with the guide surfaces.

In one embodiment, the first roller set includes two rows of rollers, the rollers in the first row of rollers each having an end surface in radial contact with the end surface of a roller in the second row of rollers.

In another embodiment, the roller bearing includes a plurality of inserts, arranged circumferentially between the rollers, each having an upper portion and a lower portion respectively in contact with one of the guide surfaces of one of the rings, and a first lateral portion linking the upper and lower portions and delimiting with the lower and upper portions a seat able to receive at least one roller, the lower and upper portions being respectively in contact with the end surfaces of the roller.

Advantageously, the first lateral portion includes an inner surface forming a support surface for the outer cylindrical surface of the roller.

Each insert may include a second lateral portion facing the first lateral portion and extending from the upper portion towards the lower portion, the upper and lower portions delimiting with the second lateral portion a seat able to receive at least two rollers.

The second lateral portion also includes an inner surface forming a support surface for the outer cylindrical surfaces of the rollers.

In one embodiment, the outer ring has two ring portions, the first ring portion having a track for the rollers in the first roller set and the second ring portion having a track for the rollers in the second roller set.

The rollers may be cylindrical or conical.

BRIEF DESCRIPTION OF THE DRAWINGS

The present invention can be better understood from the description of several embodiments, given by way of non-exhaustive examples and illustrated using the attached

DRAWINGS

Figure 1:
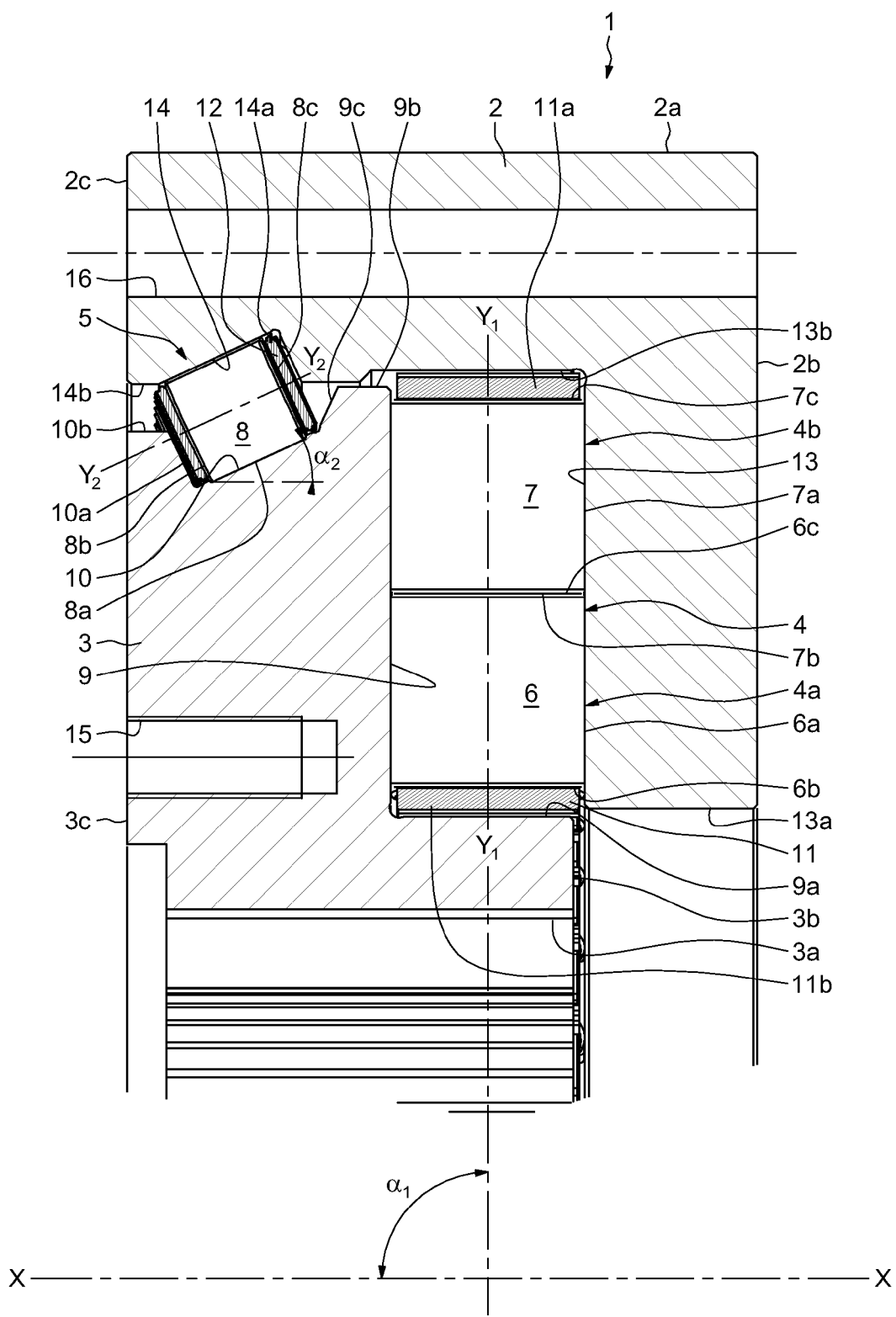
Figure 2:
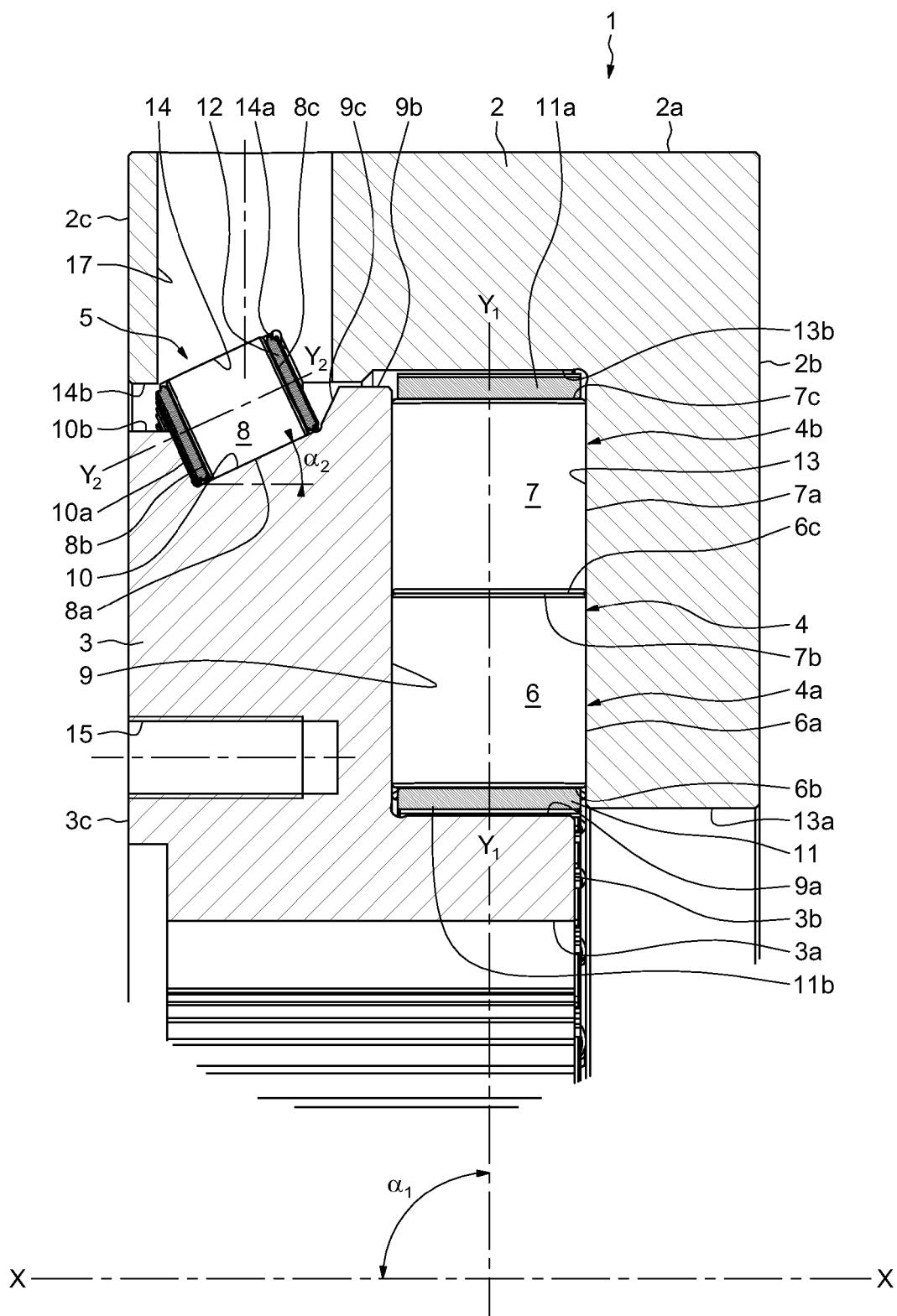
Figure 3:
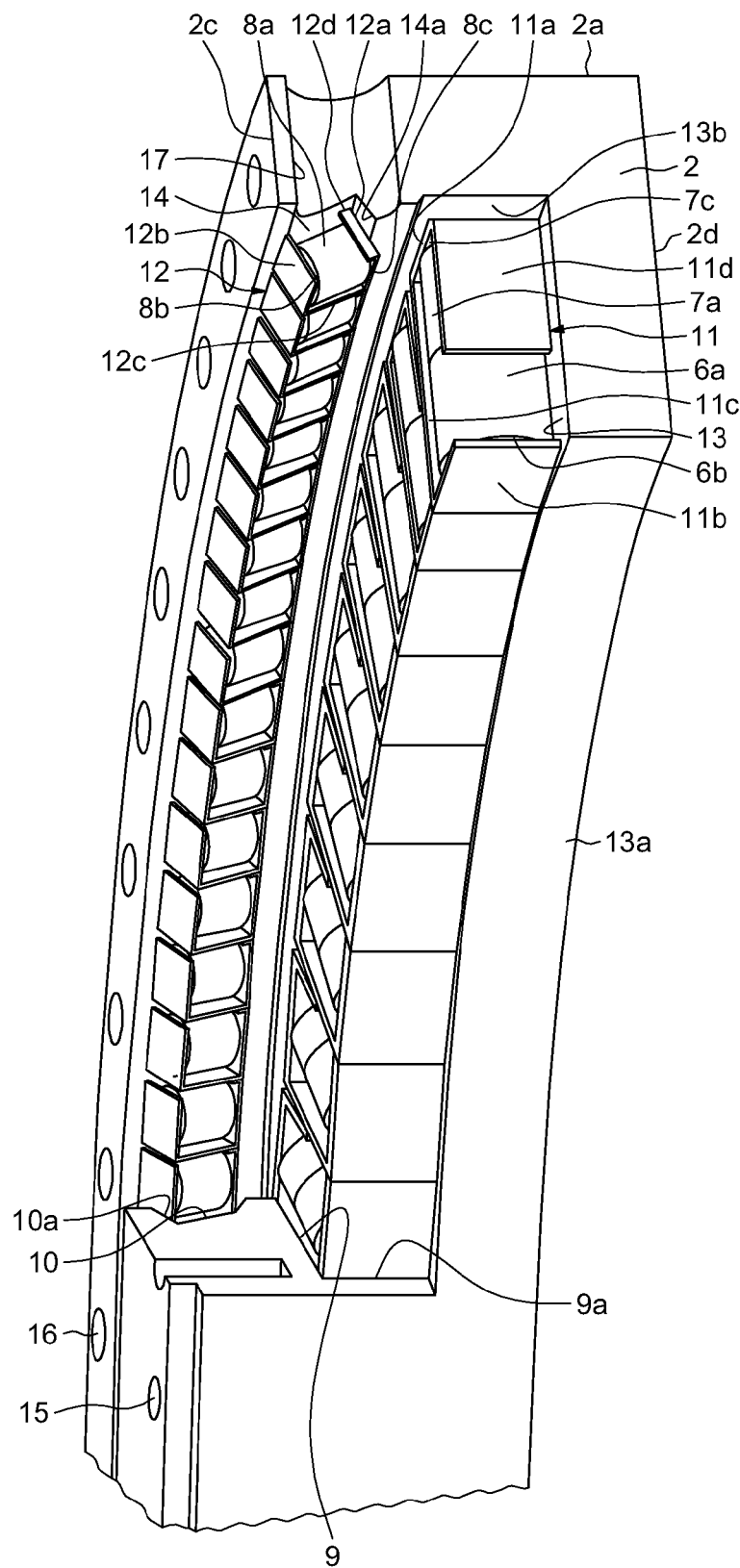
Figure 4:
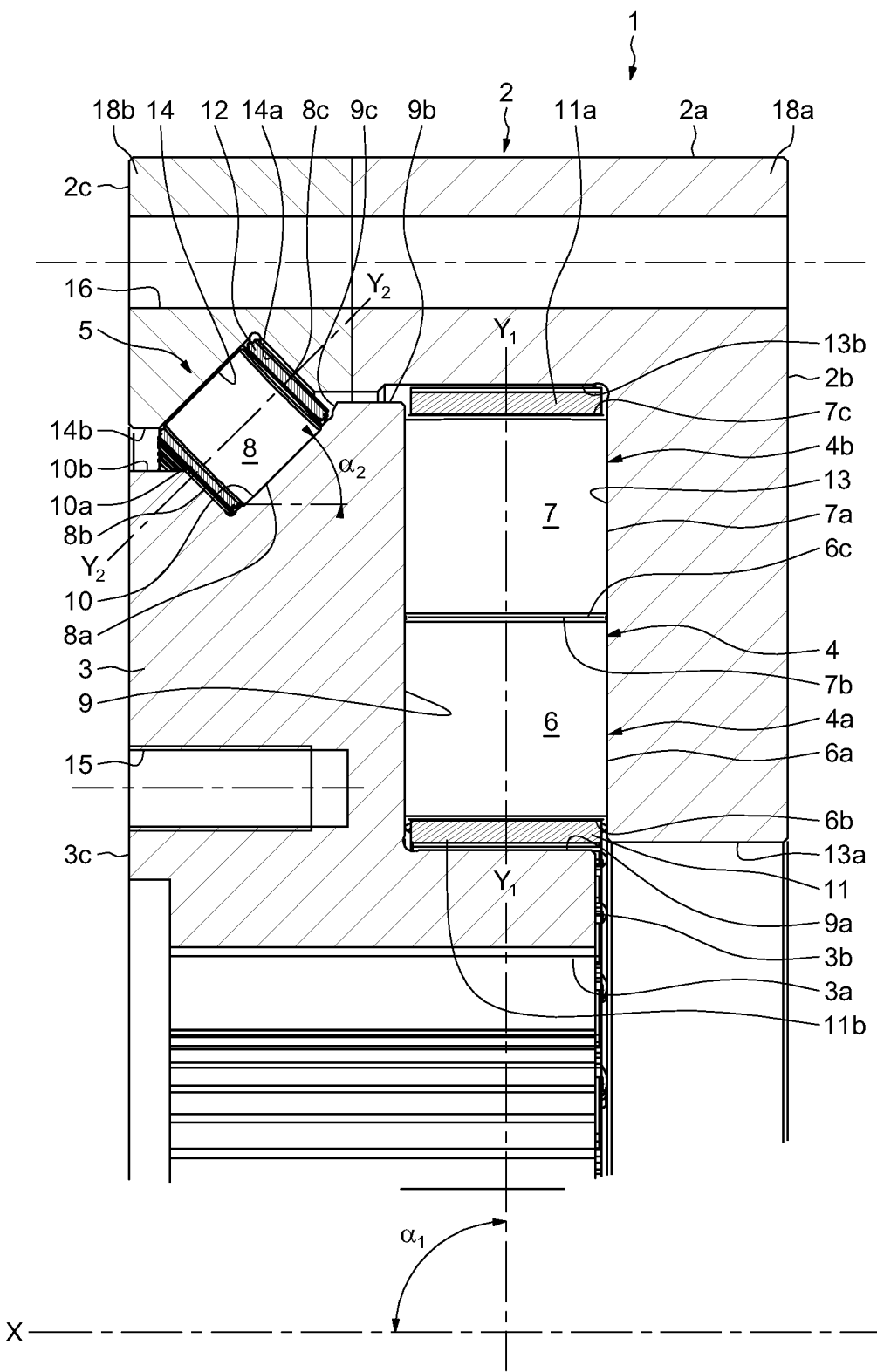

FIG. 1 is an axial cross section of a roller bearing according to a first embodiment of the invention;

FIG. 2 is a different axial cross section of the roller bearing in FIG. 1;

FIG. 3 is a perspective cross section of the roller bearing in FIG. 1;

FIG. 4 is an axial cross section of a roller bearing device according to a second embodiment of the invention.

DETAILED DESCRIPTION OF THE INVENTION

The roller bearing, with axial axis X-X, marked as a whole with reference sign 1 in FIGS. 1 to 4, is a large-diameter roller bearing intended for use in tunnel boring machines, or mooring buoys. The roller bearing 1 includes an outer ring 2, an inner ring 3, between which are arranged two sets of rolling elements 4, 5 such as rollers 6, 7, 8. The inner and outer rings 3, 2 are concentric and extend axially along the axis of rotation X-X of the roller bearing 1. The outer and inner rings 2, 3 are one-piece components made by machining or grinding a metal tube.

The rollers 6, 7 of the first roller set 4 are identical and each include a cylindrical rolling surface 6a, 7a and two opposing end surfaces 6b, 6c and 7b, 7c axially delimiting the rolling surface 6a, 7a. In the example shown, the rolling surfaces 6a, 7a have a cylindrical profile. Alternatively, the rolling surfaces 6a, 7a may have a substantially spherical or conical profile.

As shown in the figures, the first roller set 4 has two superposed rows 4a, 4b of rollers 6, 7 along the axis of rotation $Y_1$-$Y_1$ of the rollers 6, 7, making them coaxial, so as to form a roller pair such that the first roller set comprises a plurality of roller pairs. Each roller 6 of the first row of rollers 4a has a first end surface 6b in contact with the lower ring 3 and a second end surface 6c in contact with a first end surface 7b of a roller 7 of the second row of rollers 4b. The second end surface 7c of the roller 7 of the second row of rollers 4b is in contact with the outer ring 2. Thus, the first roller set 4 takes the form of two radially superposed rings, as shown in FIG. 3. Alternatively, the first roller set 4 could have just one row of rollers. The first axis of revolution $Y_1$-$Y_1$ of each roller 6, 7 of the first roller set 4 is inclined in relation to the axis of rotation X-X of the roller bearing 1 at an angle $\alpha_1$ between 45.degree. and 95.degree., for example between 85.degree. and 95.degree., for example 90.degree.

The rollers 8 of the second roller set 5 are identical and each include a cylindrical rolling surface 8a and two opposing end surfaces 8b, 8c axially delimiting the rolling surface 8a. In the example shown, the rolling surfaces 8a have a cylindrical profile. Alternatively, the rolling surfaces 8a may have a substantially spherical profile.

As shown in the figures, the second axis of revolution $Y_2$-$Y_2$ of each roller 8 of the second roller set 5 is inclined in relation to the axis of rotation of the roller bearing at an angle $\alpha_2$ between 0.degree. and 45.degree., for example 25.degree.

The rollers 6, 7 in the first roller set 4 are able to withstand the axial stresses while the rollers 8 of the second roller set 5 are able to withstand both the radial and axial stresses, as well as the angular momentum.

The rollers 6, 7 in the first roller set 4 are of a different size to the rollers 8 in the second roller set 5, such as to always absorb a greater load in one direction than in another. In the embodiment shown in FIGS. 1 to 3, the rollers 6, 7 in the first set are larger than the rollers 8 in the second set, which makes it possible to absorb a greater load in the axial direction.

The inner ring 3 has a cylindrical bore 3a designed to be mounted on a frame or a structure of a machine (not shown) delimited by opposing lateral radial surfaces 3b, 3c. The inner ring 3 has a stepped outer surface on which the first and second tracks 9, 10 are formed. In cross section, the first track 9 for the rollers 6, 7 of the first roller set 4 has a radial surface in linear contact throughout the surface thereof with the cylindrical rolling surfaces 6a, 7a of the rollers 6, 7 of the first set 4. The first track 9 is delimited radially by two axial surfaces 9a, 9b, the diameter of the first axial surface 9a being less than the diameter of the second axial surface 9b. The first axial surface 9a forms an annular guide surface in radial contact with the first end surface 6b of the rollers 6 of the first row of rollers 4a, either directly or by means of inserts 11. As shown, the guide surface 9a is perpendicular to the first track 9 and is delimited axially between the first track 9 and a lateral radial surface 3b of the inner ring 3.

In cross section, the second track 10 for the rollers 8 of the second roller set 5 has an oblique surface in linear contact throughout the surface thereof with the cylindrical rolling surface 8a of the rollers 8 of the second set 5. The second track 10 extends obliquely inwards from the second outer axial surface 9b via a surface 9c slightly inclined inwards. Alternatively, the track 10 may extend directly from the second axial surface 9b. The outer cylindrical surface of the inner ring 3 also includes a second annular guide surface 10a arranged perpendicular to the second track 10 and extending obliquely outwards via a third axial surface 10b linked to the second lateral radial surface 3c of the inner ring 3.

The second guide surface 10a is in angular contact with an end surface 8b of the second rollers 8, either directly or by means of inserts 12. As shown, the guide surface 10a is delimited axially between the second track 10 and the lateral radial surface 3c of the inner ring 3 facing the first lateral radial surface 3b. The second track 10 associated with the second guide surface 10a forms a V-shaped groove able to receive the rollers 8 of the second roller set 5.

The outer ring 2 has an outer cylindrical surface 2a delimited by opposing lateral radial surfaces 2b, 2c. The first lateral radial surface 2b extends axially beyond the first lateral radial surface 3b of the inner ring 3 while the second lateral radial surface 2c is substantially coplanar to the second lateral radial surface 3c of the inner ring 3.

The outer ring 2 has a stepped bore on which the first and second tracks 13, 14 are formed. In cross section, the first track 13 for the rollers 6, 7 of the first roller set 4 has a radial surface in linear contact throughout the surface thereof with the cylindrical rolling surfaces 6a, 7a of the rollers 6, 7 of the first set 4. The first track 13 is delimited radially by two axial surfaces 13a, 13b, the diameter of the first axial surface 13a being less than the diameter of the second axial surface 13b. The second axial surface 13b forms an annular guide surface in radial contact with the second end surface 7c of the rollers 7 of the second row of rollers 4b, either directly or by means of inserts 11. As shown, the guide surface 13b is perpendicular to the first track 13. The first axial surface 13a is delimited axially between the first track 13 and a lateral radial surface 2b of the outer ring 2.

In cross section, the second track 14 for the rollers 8 of the second roller set 5 has an oblique surface in linear contact throughout the surface thereof with the cylindrical rolling surface 8a of the rollers 8 of the second set 5.

The second track 14 extends obliquely inwards from the second axial surface 13b by means of a second annular guide surface 14a arranged perpendicular to the second track 14 and extending obliquely inwards. The second track 14 extends obliquely inwards via a third axial surface 14b connected to the second lateral radial surface 2c of the outer ring 2.

The second guide surface 14a is in oblique contact with an end surface 8c of the rollers 8 of the second set 5, either directly or by means of inserts 12. As shown, the guide surface 14a is delimited axially between the second track 14 and the first guide surface 13b. The second track 14 associated with the second guide surface 14a forms a V-shaped groove able to receive the rollers 8 of the second roller set 5, facing the V-shaped groove of the inner ring 3.

The guide surfaces 9a, 10a of the inner ring 3 face respectively the guide surfaces 13b, 14a of the outer ring 2 and are parallel to one another.

The first track 9 and the first guide surface 9a of the inner ring 3 define with the first track 13 and the first guide surface 13b of the outer ring 2 a first annular seat for receiving the first roller set 4.

The second track 10 and the second guide surface 10a of the inner ring 3 define with the second track 14 and the second guide surface 14a of the outer ring 2 a second annular seat for receiving the second roller set 5.

As illustrated in detail in FIG. 3, the roller bearing 1 includes a plurality of inserts 11, 12, arranged circumferentially between the roller sets 4, 5 in order to maintain a circumferential gap between the roller sets 4, 5 in a single row of rollers. The inserts 11, 12 are identical to one another and each one is placed between two consecutive rollers. The inserts 11 are also referenced to as the plurality of first inserts in the claims. Similarly, the inserts 12 are also referenced to as the plurality of second inserts in the claims. The inserts 11, 12 may be made of metal or bronze, or of a polymer such as polyamide, for example by casting.

The inserts 11 for the first roller set 4 each include an upper portion 11a (referenced as a first upper portion in the claims) and a lower portion 11b (referenced as a first lower portion in the claims) respectively in contact with one of the guide surfaces 9a, 13b of the inner and outer rings 2, 3, and a first lateral portion 11c (referenced as a first roller pair lateral portion in the claims) radially linking the upper and lower portions 11a, 11b. The first lateral portion 11c delimits with the lower and upper portions 11a, 11b a seat able to receive two coaxial rollers 6, 7 (also referenced as roller pair in the claims) superposed along the first axis of revolution $Y_1$-$Y_1$. The inserts 11 (also referenced as the plurality of first inserts in the claims) are each positioned around one of the plurality of rollers pairs 6, 7. The plurality of first inserts preferably being at least partially detached from each other. The plurality of first inserts being positioned such that each of the plurality of first inerts abuts two other of the plurality of first inserts. Alternatively, a single roller may be provided in the seat of each of the first inserts 11. The upper and lower portions 11a, 11b are respectively in contact with the end surfaces 6b, 7c of the two rollers 6, 7 placed in the first seat. The first lateral portion 11c includes an inner surface (not referenced) forming a support surface for the cylindrical rolling surfaces 6a, 7a of each of the rollers 6, 7. As illustrated, the inserts 11 of the first roller set 4 each include a second lateral portion 11d (referenced as the second roller pair later portion in the claims) facing the first lateral portion 11c and extending from the upper portion 11a towards the lower portion 11b. The second lateral portion 11d includes an inner surface (not referenced) forming a support surface for the cylindrical rolling surfaces 6a, 7a of each of the rollers 6, 7. The second lateral portion 11d preferably does not contact the first lower portion 11b.

The inserts 12 for the second roller set 5 each include an upper portion 12a (referenced as a second upper portion in the claims) and a lower portion 12b (referenced as a second lower portion in the claims) respectively in contact with one of the guide surfaces 14a, 10a of the outer and inner rings 2, 3, and a first lateral portion 12c (referenced as a first roller lateral portion in the claims) linking the upper and lower portions 12a, 12b. The first lateral portion 12c delimits with the upper and lower portions 12a, 12b a second seat able to receive one of the rollers 8 of the second roller set 5. The upper and lower portions 12a, 12b are respectively in contact with the end surfaces 8c, 8b of the roller 8 placed in the second seat. The first lateral portion 12c (also referenced as a first roller lateral portion in the claims) includes an inner surface (not referenced) forming a support surface for the cylindrical rolling surface 8a of the roller 8. The inserts 12 (also referenced as the plurality of second inserts) are each positioned around one of the plurality of rollers. The plurality of second inserts preferably being at least partially detached from each other. The plurality of second inserts preferably being positioned such that each of the plurality of second inserts abuts two other of the plurality of second inserts. As illustrated, the inserts 12 of the second roller set 5 each include a lateral hook 12d (also referenced as a second roller lateral portion in the claims) facing the first lateral portion 12c and extending from the upper portion 12a towards the lower portion 12b. The inner surface (not referenced) of the lateral hook 12d is partially in contact with the cylindrical rolling surface 8a of the roller 8 placed in the second seat. The lateral hook 12d preferably does not contact the lower portion 12b.

As shown in FIG. 1, the inner and outer rings 3, 2 each include axial holes 15, 16 for assembling the rings 2, 3 on two elements of the machine (not shown) in rotation in relation to one another.

The outer ring 2 has a radial orifice 17, visible in FIGS. 2 and 3, passing through the radial thickness of the outer ring 2. The radial orifice 17 extends from the outer cylindrical surface 2a of the outer ring 2 towards the bore of the outer ring and allows the rollers 8 of the second roller set 5 to be put in place, along with the inserts 12 of the second roller set 5.

The embodiment shown in FIG. 4, in which the same elements have the same reference signs, shows a roller bearing 1 including an inner ring 3, an outer ring 2 and two roller sets 4, 5.

The roller bearing 1, with the axis X-X, differs from the roller bearing shown in FIGS. 1 to 3 only in that the outer ring 2 has two ring portions 18a, 18b.

The first ring portion 18a includes a first track 13 and the guide surface 13b for the rollers 6, 7 of the first roller set 4, which are identical to the first track 13 and the guide surface 13b shown in FIGS. 1 to 3, and the second ring portion 18b includes a track 14 and a guide surface 14a for the rollers 8 of the second roller set 5, which are identical to the second track 14 and the guide surface 14a shown in FIGS. 1 to 3.

The invention enables the roller bearing to withstand significant axial and radial stresses. The two roller sets enable the roller bearing to absorb more stress in one direction than in another.

Finally, the reduction in the number of roller sets reduces vibration during operation of the roller bearing, as well as the risk of the rollers slipping in the tracks not subject to any stresses.

The invention claimed is:

1. A roller bearing for a tunneller, comprising:
an inner ring,
an outer ring,
first and second sets of rolling elements arranged between tracks formed on the inner ring and the outer ring the first set of rolling elements including at least one roller able to withstand axial stresses and the second set of rolling elements including an angular-contact roller that is able to withstand both radial and axial stresses, wherein
the inner and outer rings are concentric about an axis of rotation (X-X) of the roller bearing, and wherein
each roller in the first set includes a first axis of revolution ($Y_1$-$Y_1$) inclined in relation to the axis of rotation (X-X) by a first angle ($\alpha_1$) between forty five degrees (45°) and ninety-five degrees (95°) and each roller in the second set includes a second axis of revolution ($Y_2$-$Y_2$) inclined in relation to the axis of rotation (X-X) by a second angle ($\alpha_2$) of greater than zero degrees (0°) and not more than forty five degrees (45°), the first roller set comprising first and second rows of rollers such that each roller in the first row of rollers has an end surface in radial contact with an end surface of a roller in the second row of rollers to form a roller pair such that the first roller set comprises a plurality of roller pairs, and
a plurality of first inserts each positioned around one of the plurality of roller pairs, the plurality of first inserts being detached from each other, the plurality of first inserts being positioned such that each of the plurality of first inserts abuts two other of the plurality of first inserts, wherein the plurality of first inserts covers all of at least three, but less than four, later sides of the roller pair such that at least a portion of a lateral side of the roller pair remains unclosed, wherein all of the four lateral sides are oriented generally perpendicular to the portions of the inner and outer rings that contact the roller pair.

2. The roller bearing according to claim 1, wherein the first angle ($\alpha_1$) is between eighty five degrees (85°) and ninety five degrees (95°).

3. The roller bearing according to claim 2, wherein the first angle ($\alpha_1$) is ninety degrees (90°).

4. The roller bearing according to claim 3, wherein the second angle ($\alpha_2$) is twenty five degrees (25°).

5. The roller bearing according to claim 1, wherein the second angle ($\alpha_2$) is twenty five degrees (25°).

6. The roller bearing according to claim 1, wherein the size of the rollers in the first set is greater than the size of the rollers in the second set.

7. The roller bearing according to claim 1, wherein the plurality of first inserts comprise:
   a first upper portion and a first lower portion, and
   a first roller pair lateral portion linking the first upper and first lower portions and delimiting with the first lower and first upper portions a seat able to receive the roller pair, wherein
   the first lower and first upper portions are respectively in contact with the end surfaces of the roller pair.

8. The roller bearing according to claim 7, wherein the first roller pair lateral portion includes an inner surface forming a support surface for the outer cylindrical surface of the roller pair.

9. The roller bearing according to claim 7, wherein the plurality of first inserts further comprises:
   a second roller pair lateral portion oriented parallel the first roller pair lateral portion and extending from the first upper portion toward the first lower portion, the second roller pair lateral portion not contacting the first lower portion.

10. The roller bearing according to claim 9, wherein the second roller pair lateral portion includes an inner surface forming a support surface for the outer cylindrical of at least one of the rollers of the roller pair.

11. The roller bearing according to claim 7 wherein,
   the outer ring further comprises a first upper axial guide surface which directly abuts the first upper portions of the plurality of first inserts on a side thereof opposite the plurality of roller pairs,
   the inner ring further comprises a first lower axial guide surface which directly abuts the first lower portions of the plurality of first inserts opposite the plurality of roller pairs.

12. The roller bearing according to claim 1, wherein the second set of rolling elements comprises a single row of rollers, a plurality of second inserts each positioned around one of the plurality of rollers, the plurality of second inserts being detached from each other, the plurality of second inserts being positioned such that each of the plurality of second inserts abuts two other of the plurality of second inserts.

13. The roller bearing according to claim 12, further comprising a radial orifice connecting an outer cylindrical surface of the outer ring to an inner cylindrical surface of the outer ring, the orifice being configured to allow insertion of the plurality of second inserts, each containing one of the rollers of the single row of rollers, therethrough.

14. The rolling bearing according to claim 12, wherein the plurality of second inserts each comprise:
   a second upper portion and a second lower portion, and
   a first roller lateral portion linking the second upper and second lower portions and delimiting with the second lower and second upper portions a seat able to receive at least one roller, wherein
   the second lower and second upper portions are respectively in contact with the end surfaces of the at least one roller.

15. The roller bearing according to claim 14, wherein the first roller lateral portion includes an inner surface forming a support surface for the outer cylindrical surface of the at least one roller.

16. The roller bearing according to claim 14, further comprising:
   a second roller lateral portion oriented parallel to the first roller lateral portion and extending from the second upper portion toward the second lower portion, the second roller lateral portion not contacting the second lower portion.

17. The roller bearing according to claim 16, wherein the second roller lateral portion includes an inner surface forming a support surface for only a portion of the outer cylindrical surface of a single roller.

18. The roller bearing according to claim 12 wherein,
   the outer ring further comprises a second upper axial guide surface which directly abuts the second upper portions of the plurality of second inserts opposite one roller of the single row of rollers;
   the inner ring further comprises a second lower axial guide surface which directly abuts the second lower portions of the plurality of second inserts opposite the one roller of the single row of rollers.

19. The roller bearing according to claim 12, wherein the plurality of second inserts covers all of at least three, but less than four, lateral sides of the roller pair such that at least a portion of a lateral side the roller pair remains unenclosed, wherein all of the four lateral sides are oriented generally perpendicular to the portions of the inner and outer rings that contact the one roller.

* * * * *